United States Patent Office 3,351,748
Patented Nov. 7, 1967

3,351,748
ELECTRICAL ANALOGUE COMPUTING CIRCUITS WHICH DETERMINE THE MODULES OF THE DIFFERENCE OF TWO QUANTITIES
Raymond Calvert, Chessington, Surrey, England, assignor to The Wayne Kerr Laboratories Limited, Chessington, Surrey, England, a British company
Filed Apr. 8, 1964, Ser. No. 358,338
Claims priority, application Great Britain, Apr. 9, 1963, 14,197/63
11 Claims. (Cl. 235—193)

ABSTRACT OF THE DISCLOSURE

An electrical analogue computing circuit determines the modulus of the difference of two quantities. In the simplest construction a potentiometer has two separately adjustable taps. Switch means enable a constant current source to be selectively connected between one end and one tap, between one end and the other tap and between the two taps and voltage measuring means are connected across the selected portion of the potentiometer.

---

In electrical analogue computers, it may be required to determine the modulus of the difference of two quantities, that is to say the magnitude of the difference between the greater and the smaller quantity without regard to which is the greater. It is an object of the present invention to provide an electrical circuit arrangement for determining this modulus.

According to this invention, an electrical analogue computing circuit for determining the modulus of the difference of two quantities comprises a potentiometer having two adjustable taps, a constant current source for feeding said potentiometer and means responsive to the resultant voltage across he portion of the potentiometer between the two taps. If the potentiometer is of magnitude R with the taps adjusted so that the resistance from one end to one tap is $\alpha R$ and to the other tap $\beta R$, and if the constant current I is fed through the potentiometer, the output voltage $E_0$ between the two taps is given by $$E_0 = I|\alpha R - \beta R| = IR|\alpha - \beta|$$

With this arrangement very conveniently an alternating current source is employed.

Preferably switch means are provided for selectively coupling said means responsive to the resultant voltage between one end of the potentiometer and one tap or between one end of the potentiometer and the other tap or between the two taps. Consider for example a voltmeter used as said means responsive to the resultant voltage; by connecting it between one end of the potentiometer and the first tap, the first tap of the potentiometer may be adjusted until the voltmeter indicates $\alpha IR$, then connecting it between the end of the potentiometer and the second tap, the second tap may be adjusted until the voltmeter reads $\beta IH$. The potentiometer is thus adjusted and, if the voltmeter is now connected between the two taps it will indicate $|\alpha - \beta|IR$. Thus a linearly calibrated voltmeter may be used for setting in $\alpha$ and $\beta$ and for reading $|\alpha - \beta|$ irrespective of the magnitude of I (so long as it remains constant during the setting in and reading process). Furthermore the accuracy is wholly independent of the resistance or linearity of the potentiometer.

The current need only be fed through the part of the potentiometer across which the output voltage is measured and it may often be convenient to arrange that said switch means connect the current source to the tapped portion of the potentiometer across which said means responsive to the resultant voltage are switched. The magnitude of the output voltage from said source, which for example, can be applied to a voltmeter or other output circuit, is then a measure of the magnitude of the tapped portion of the potentiometer. This arrangement may also be particularly convenient if means are provided for alternatively connecting a constant voltage source to the tapped portion of the potentiometer and measuring the resultant current instead of feeding the potentiometer from a constant current source. This provision of an alternative feed source enables certain further computations to be made. For example, if the potentiometer is set up as before to have tapped portions $\alpha R$ and $R\beta$, and the potentiometer is then fed with a constant voltage E across the tapped portion and the output current $I_0$ is measured, then $$I_0 = \frac{E}{|\alpha R - \beta R|} = \frac{E}{R} \frac{1}{|\alpha - \beta|}$$

Thus the reciprocal of the modulus can be determined.

Another possibility to apply the constant voltage E between one end of the potentiometer and each of the taps in turn, adjusting each tap until the output currents are $$A = \frac{E}{\alpha R}$$

and $$B = \frac{E}{\beta R}$$

respectvely, then by measuring the output voltage $E_0$ between the two taps with a constant current I fed to the potentiometer $$E_0 = I|\alpha R - \beta R|$$
$$= IE\left|\frac{1}{A} - \frac{1}{B}\right|$$

Thus the modulus of the reciprocals of the input settings A and B is determined.

A further possibility is to set the potentiometer taps to A and B as described above and then to measure the output current $I_0$ when a constant voltage E is applied between the taps. In this case $$I = \frac{E}{|\alpha R - \beta R|}$$
$$= \frac{1}{\left|\frac{1}{A} - \frac{1}{B}\right|}$$

Thus the reciprocal of the modulus of the reciprocals of the input settings is determined.

Very conveniently the aforesaid constant current source comprises a high gain amplifier, means for applying a known or reference alternating voltage through a standard impedance to the input of the amplifier and means connecting the portion of said potentiometer through which a constant current source is fed to form a negative feedback path across the amplifier. The means responsive to the resultant voltage then may comprise means for indicating the output voltage of the amplifier. If the standard impedance is of magnitude Z and the potentiometer is of magnitude R with the taps adjusted so that the resistance from one end to one tap is $\alpha R$ and to the other tap $\beta R$, then provided the gain of the amplifier is sufficiently high that the net input voltage can be disregarded compared with the output voltage $E_0$ and the voltage E applied to the standard impedance, then $$E_0 = |\alpha - \beta|\frac{R}{Z}E$$

The output voltage $E_0$ is thus a measure of the modulus $|\alpha - \beta|$. The two variables may readily be set in turn by connecting the portions αR and βR separately as the feedback resistor and the tap until the indicator, indicating the voltage across the output of the amplifier, indicates α or β as appropriate. The exact magnitudes of R and Z are immaterial and the magnitude of E does not matter so long as it remains constant during the measurement. For setting in the variables, the aforementioned switch means may be arranged for connecting the input (or output) of the amplifier to one end of the potentiometer and for connecting the output (or input) to each of the taps in turn. Provided the appropriate portion of the potentiometer is connected in the feedback circuit, then the output voltage of the amplifier is a measure of the voltage across that portion of the potentiometer when the standard current is passing. It will be noted moreover that the impedance of the voltage measuring means does not affect the accuracy of the computation.

In the above described construction using a high gain amplifier, a constant voltage source may be connected across the potentiometer, in place of the constant current source by arranging said switch means to interchange said standard impedance and the selected portion of the potentiometer. The aforesaid means for indicating the output voltage of the amplifier will then indicate the current through the selected portion of the potentiometer due to said known or reference voltage. Thus the reciprocal of the modulus can be determined by setting the potentiometer taps as has previously been described for determining the modulus and then operating said switch means to feed the potentiometer between said taps with a constant voltage and measuring the resultant current through this portion of the potentiometer. Similarly the modulus of the reciprocals may be obtained by setting the taps when the switch means are in the position to feed a constant voltage to the appropriate portion of the potentiometer and then changing the switch means to measure the voltage between the taps due to a constant current feed. The reciprocal of the modulus of the reciprocals is obtained by setting in the input quantities and reading the output with a constant voltage applied to the appropriate portions of the potentiometer in turn, the resultant current being measured.

Although reference has been made, in explaining the invention, to measuring voltages and currents, in practice it may not be necessary to indicate these on meters. The modulus computing circuit may form part of an analogue computing system in which the outputs from the modulus extraction circuit are utilised for further processing. Furthermore although voltages and currents can be indicated directly on meters, in computing apparatus it may be more convenient to use other measuring systems. For example a current can be measured by an admittance bridge circuit which compares the current to be measured with the current produced by feeding a known voltage through a known impedance; the voltage may be adjustable e.g. using a tapped transformer or potential divider, and/or the impedance may be adjustable. Likewise a voltage can be measured by an impedance-measuring bridge circuit.

The following is a description of a number of embodiments of the invention, reference being made to the accompanying drawings in which.

Figure 1:
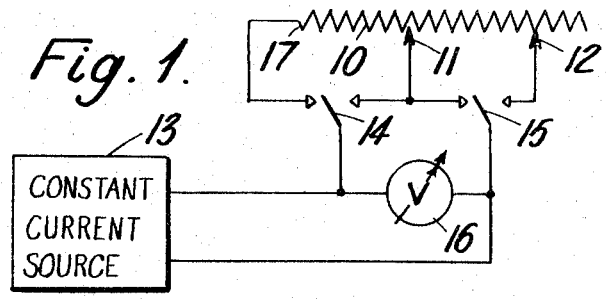
FIGURE 1 is a diagram of an apparatus for determining the modulus of two quantities.

Referring to FIGURE 1, there is shown a resistive potentiometer 10 of magnitude R and having two adjustable taps 11, 12. A constant current source 13 feeds a current I into a selected portion of the potentiometer 10 by means of two switch contacts 14, 15 which are illustrated diagrammatically as separately operable switches. In practice these switch contacts would be preferably controlled by means of a three position switch which could be set to give any selected one of the three possible combinations of the positions of switch contacts 14, 15 which are required. A voltage responsive device, indicated diagrammatically by a voltmeter 16 is provided for indicating the voltage across the portion of the potentiometer selected by the switch contacts 14, 15. The impedance of the voltmeter 16 must be high compared with that of the potentiometer so that no significant proportion of the current from the source is taken by the voltmeter. The voltmeter is linearly calibrated in any arbitrary units of voltage.

The apparatus of FIGURE 1 is used to determine the modulus of the difference of two quantities α and β in the following manner: The switch contact 14 is set to connect one output terminal of the current source to one end 17 of the potentiometer and the switch contact 15 is set to connect the other output terminal to the tap 11. Tap 11 is then adjusted until the meter reading is proportional to α. The switch contact 15 is changed over to complete the circuit to tap 12 and that tap is then adjusted until the meter reading is proportional to β. Switch contact 14 is then changed over and the output voltage between the taps is read on the meter 16. This voltage is proportional with the same proportionality factor as was used for the input settings, to the modulus $|\alpha-\beta|$.

Figure 2:
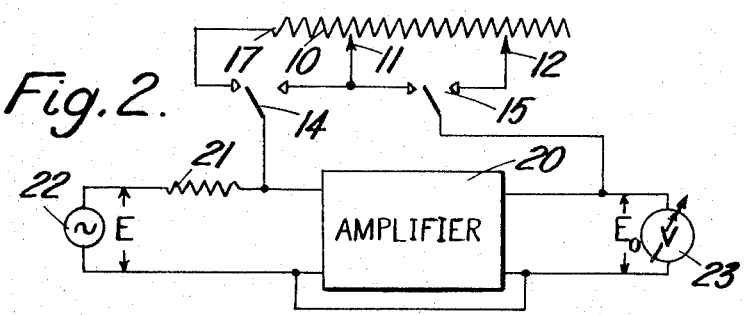
FIGURE 2 is a diagram illustrating a preferred construction of the apparatus of FIGURE 1.

FIGURE 2 illustrates a preferred form of construction for the apparatus of FIGURE 1. In FIGURE 2 the same reference characters are used as in FIGURE 1 to refer to corresponding components. In FIGURE 2, the constant current source comprises a high gain amplifier 20 with an input standard impedance 21 of magnitude Z. A known or reference voltage E, from an alternating voltage source 22, is applied to the input of the amplifier 20 through the standard impedance 21. Alternatively the input of the amplifier may be fed directly from a constant current source. The switch contacts 14, 15 are connected respectively to the input and output of the amplifier so that the selected portion of the potentiometer 10 is connected as a feedback resistance across the amplifier. A voltage responsive device, indicated diagrammatically as a voltmeter 23, is connected across the output of the amplifier 20 to indicate the output voltage $E_o$. The amplifier has a high open loop gain so that the feedback current is very closely equal to the input current through impedance 21. This input current is equal to $E/Z$ and is constant; hence the feedback current, to a close approximation, is $E/Z$ and constant no matter what portion of the potentiometer is connected in the feedback circuit. The arrangement of FIGURE 2 is operated in a similar manner to that of FIGURE 1, the switch contacts 14 and 15 being set to connect the portion of the potentiometer between end 17 and tap 11 in the feedback path and the tap 11 being adjusted until the meter reading is proportional to α and then the switch contact 15 is changed over and the tap 12 adjusted until the meter reading is proportional to β. The switch contact 14 is then changed over and the reading on the meter is now the modulus $|\alpha-\beta|$.

Figure 3:
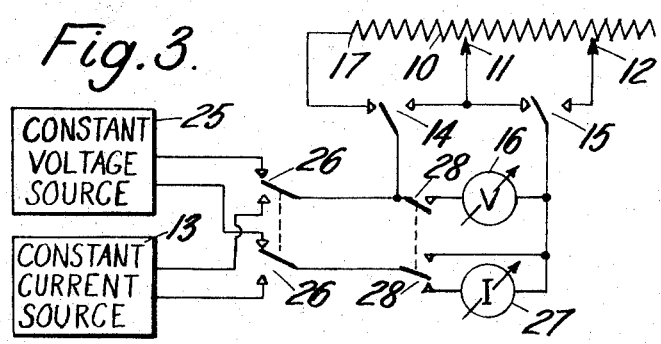
FIGURE 3 is a diagram illustrating a modification of the apparatus of FIGURE 1, enabling certain further computations to be effected.

FIGURE 3 illustrates how the apparatus of FIGURE 1 can be modified to enable certain further computations to be effected. In FIGURE 3 the same reference characters are used as in FIGURE 1 to indicate corresponding components. FIGURE 3 shows a constant voltage source 25 which, by means of switch contacts 26, can be connected in place of the constant current source 13. Also a current indicator 27 can be connected in place of the voltmeter 16 by means of switch contacts 28 which are ganged with the contacts 26 so that the current indicator is brought into circuit when the constant voltage source is used. The arrangement of FIGURE 3 may be used to determine the reciprocal of the modulus of two quantities α and β, that is $$\frac{1}{|\alpha-\beta|}$$

in the following manner: the constant current source 13 and voltmeter 16 are used, as described with reference to FIGURE 1, to set the taps 11 and 12 giving voltmeter readings proportional to α and β respectively. The switch contacts 26, 28 are then changed over to apply a constant voltage E to the part of the potentiometer 10 between the taps 11, 12. The resistance of this part of the potentiometer is $|\alpha-\beta|R$ and hence the output current $I_o$ indicated on the indicator 27 is $$\frac{E}{|\alpha-\beta|R}$$

and hence is proportional to the reciprocal of the modulus.

A further use of the apparatus of FIGURE 3 is to determine the modulus of the reciprocals. This is done by using the constant voltage source 25 and current indicator 27 to set firstly tap 11 so that the output current is proportional to A, say $AI_1$, and then to set tap 12 so that the output current is $BI_1$. The resistance of the selected portions of the potentiometer are $E/AI_1$ and $E/BI_1$ respectively. Now a constant current I is fed between the taps 11, 12 from the constant current source 13 and the voltmeter 16 will give a reading $$E_o = \frac{IE}{I_1}\left|\frac{1}{A}-\frac{1}{B}\right|$$

It may similarly be shown that, if the constant voltage source is used and the taps 11, 12 adjusted to give current outputs $AI_1$ and $BI_1$ as above and the switch contacts 14, 15 then set to measure the resultant current between the taps 11, 12 using the constant voltage source to feed the potentiometer 10 between these taps, the output indication is proportional to $$\frac{1}{\left|\frac{1}{A}-\frac{1}{B}\right|}$$

that is to say the reciprocal of the modulus of the reciprocals.

Figure 4:
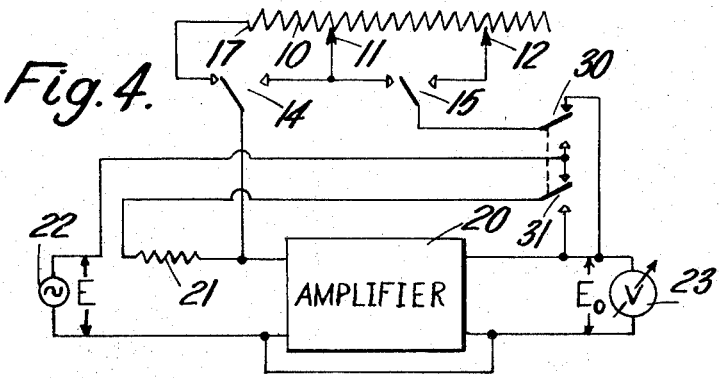
FIGURE 4 is a diagram illustrating a preferred construction of the apparatus of FIGURE 3.

FIGURE 4 illustrates a modification of the circuit of FIGURE 2 constituting a preferred example of the arrangement of FIGURE 3. The same reference characters are used as in FIGURE 2 and it will be seen that ganged switch contacts 30, 31 are provided which enable the impedance 21 and the selected portion of the potentiometer 10 to be interchanged. In one position of these contacts 30, 31, the circuit operates as described with reference to FIGURE 2. In the other position, the portion of the potentiometer 10 selected by contacts 14, 15 is connected in the input circuit of the amplifier 20 to be fed from the constant voltage source 22. The standard impedance 21 is connected in the feedback path. The voltmeter 23 then indicates the output voltage required to provide, through the standard impedance 21, a feedback current to balance the input current to the amplifier due to the voltage source 22 feeding the selected portion of the potentiometer; the voltmeter reading is thus proportional to the current through the selected portion of the potentiometer and so corresponds to the current indicator 27 of FIGURE 3. It will be seen therefore that the contacts 30, 31 correspond to the contacts 26, 28 of FIGURE 3 and that the apparatus of FIGURE 4 may be used, in a manner similar to that of FIGURE 3, to measure the reciprocal of the modulus of two quantities or the modulus of the reciprocals or the reciprocal of the modulus of the reciprocals.

In the arrangement of FIGURE 4, the output indication is always the output voltage of an amplifier having a high open loop gain but with negative feedback. This output voltage need not necessarily be applied to a voltmeter but may be used for further computation and the impedance of any load circuit fed by the amplifier will not affect the accuracy of the computation. Instead of using a voltmeter 16 or 23, an impedance bridge circuit may be employed to compare the impedance of the selected portion of the potentiometer with a standard. It will be noted that in FIGURE 4 instead of measuring the current through the selected portion of the potentiometer with a current indicator 27 as in FIGURE 3, this current is compared with the current from a known voltage source feeding a known impedance, the voltage source being adjustable. This arrangement constitutes an admittance bridge and alternatively or additionally the impedance might be made adjustable for measuring the current.

In each of the arrangements described, it is immaterial whether or not the potentiometer 10 is linear. This potentiometer need not necessarily be resistive although conveniently a resistive potentiometer is used. In FIGURES 2 and 4 the standard impedance 21 may be resistive or reactive. If the output voltage of the amplifier is to be used for further computations, it may be desirable in some cases to introduce a quadrature phase shift by using a reactive standard impedance with a resistive potentiometer.

I claim:

1. An electrical analogue computing circuit for determining the modulus of the difference of two quantities comprising a potentiometer having two adjustable taps, a constant current source arranged to feed said potentiometer, means responsive to the magnitude of a voltage and switch means arranged for selectively coupling said responsive means between one end of the potentiometer and one tap or between said one end of the potentiometer and the other tap or between the two taps.

2. An electrical analogue computing circuit as claimed in claim 1 wherein said source is a source of alternating current.

3. An electrical analogue computing circuit for determining the modulus of the difference of two quantities comprising a potentiometer having two adjustable taps, a constant current source, switch means arranged for selectively coupling said source to said potentiometer to feed a constant current between one end of the potentiometer and one tap or between said one end of the potentiometer and the other tap or between the two taps and means for measuring the voltage applied to the selected portion of the potentiometer from said source.

4. An electrical analogue computing circuit comprising a potentiometer having two adjustable taps, a constant current source, a constant voltage source, voltage measuring means, current measuring means, two input leads, first switch means arranged for selectively coupling said input leads to said constant current source or said constant voltage source, second switch means arranged for selectively coupling said input leads respectively to one end and to one tap of said potentiometer or to said one end and the other tap or to the two taps, said first switch means being further arranged to connect said voltage measuring means to measure the voltage across the selected portion of the potentiometer when the latter is fed from the constant current source and to connect said current measuring means to measure the current through the selected portion of the potentiometer when the latter is fed from the constant voltage source.

5. An electrical analogue computer for determining the modulus of the difference of two quantities comprising a potentiometer having two adjustable taps, a constant current source, a high gain amplifier having an input and an output, voltage measuring means coupled to said amplifier to measure the voltage at the output from the amplifier, means feeding a constant current from said source into the input of said amplifier, and selector switch means arranged for coupling, as a feedback circuit from the output to the input of said amplifier, selectively a portion of the potentiometer between one end thereof and one tap or between said one end and the other tap or between the two taps.

6. An electrical analogue computer as claimed in claim 5 wherein said constant current source is an alternating current source.

7. An electrical analogue computer as claimed in claim 5 wherein said constant current source comprises a constant voltage source in series with a fixed impedance.

8. An electrical analogue computer comprising a potentiometer having two adjustable taps, a constant voltage source, a standard impedance, a high gain amplifier having an input and an output, means for measuring the voltage at the output of said amplifier, first selector switch means for selecting any of the portions of the potentiometer between one end and one tap or between said one end and the other tap or between the two taps, and second selector switch means arranged alternatively to connect said standard impedance in series with said constant voltage source to feed a current into the amplifier input and to connect the selected portion of the potentiometer as a feedback circuit between the output and the input of the amplifier or connect said standard impedance as a feedback circuit between the output and the input of the amplifier and to connect the selected portion of the potentiometer in series with said constant voltage source to feed current into the amplifier input.

9. An electrical analogue computer as claimed in claim 8 wherein said constant voltage source is an alternating voltage source.

10. An electrical analogue computer as claimed in claim 8 wherein said potentiometer is a resistive potentiometer.

11. An electrical analogue computer as claimed in claim 8 wherein said means for measuring the voltage comprises a calibrated voltmeter.

References Cited

UNITED STATES PATENTS

| | | | |
|---|---|---|---|
| 2,494,076 | 1/1950 | Williams | 235—193 |
| 2,900,458 | 8/1959 | Rawdin. | |
| 2,989,238 | 6/1961 | Ford | 235—193 X |

MALCOLM A. MORRISON, *Primary Examiner.*

J. RUGGIERO, *Assistant Examiner.*